United States Patent

Ehrlich

[11] 4,162,663
[45] Jul. 31, 1979

[54] STRATIFIED CHARGE FOUR-STROKE ENGINE

[75] Inventor: Josef Ehrlich, Ashridge, Near Berkhemsted, England

[73] Assignee: Outboard Marine Corporation, Waukegan, Ill.

[21] Appl. No.: 808,075

[22] Filed: Jun. 20, 1977

[30] Foreign Application Priority Data

Jul. 5, 1976 [GB] United Kingdom ............... 27910/76

[51] Int. Cl.² ............................................. F02B 75/04
[52] U.S. Cl. ............................ 123/75 B; 123/124 R; 123/65 W
[58] Field of Search ............... 123/75 B, 65 W, 124 R

[56] References Cited

U.S. PATENT DOCUMENTS

| | | | |
|---|---|---|---|
| 1,580,420 | 4/1926 | Dempsey | 123/75 B |
| 1,825,817 | 10/1931 | Patterson | 123/75 B |
| 1,890,813 | 12/1932 | Heinzelmann | 123/75 B |
| 1,926,499 | 9/1933 | Ricardo | 123/32 C |
| 2,008,089 | 7/1935 | Timian | 123/75 B |

FOREIGN PATENT DOCUMENTS

| | | |
|---|---|---|
| 26411 | 10/1931 | Netherlands . |
| 111152 | 4/1947 | Netherlands . |
| 12831 | 9/1916 | United Kingdom . |
| 406173 | 2/1934 | United Kingdom . |

*Primary Examiner*—Charles J. Myhre
*Assistant Examiner*—David D. Reynolds
*Attorney, Agent, or Firm*—Michael, Best & Friedrich

[57] ABSTRACT

Disclosed herein is an internal combustion engine comprising a cylinder, a piston movable in the cylinder between top dead center and bottom dead center positions, and an air entry port located in the cylinder adjacently above the piston when the piston is at bottom dead center and adapted to be opened and closed in response to piston movement, which air entry port extends generally tangentially from the cylinder so that air entering the cylinder through the port swirls within the cylinder, together with valve means preventing flow from the cylinder and permitting flow into the cylinder.

4 Claims, 2 Drawing Figures

STRATIFIED CHARGE FOUR-STROKE ENGINE

BACKGROUND OF THE INVENTION

This invention relates to internal combustion engines and more particularly to four stroke internal combustion engines. The invention also relates to methods and arrangements for effective stratification and turbulence in the cylinder of an internal combustion engine.

SUMMARY OF THE INVENTION

The invention disclosed herein provides an internal combustion engine having at least one air inlet port which may or may not be valve controlled and which is arranged to permit entry of air to the cylinder at/or near bottom dead center.

Preferably a second or main inlet valve is also provided and is arranged to be closed or nearly closed, when the entry of air through the air inlet port commences so that the final piston movement on the suction stroke will draw the air into the cylinder. It is also possible to have an engine driven pump for pressurizing the air for entry into the cylinder through the inlet port or ports.

In a preferred form of the invention, the inlet port or ports are each directed tangentially into the cylinder so that the air will enter with a swirling movement mainly between the indrawn charge and the cylinder wall. Conveniently there is an array of inlet ports disposed circumferentially around the cylinder wall and they may open from a local gallery surrounding the cylinder wall and communicating with atmosphere or the outlet of an engine driven pump.

The air inlet port or ports are conveniently simply uncovered by the piston on the last part of the induction stroke so that the final piston movement draws the air into the cylinder. Alternatively the air can enter under pressure established by a pump, or any other menas.

The inlet port or ports can each be fitted with a reed valve or other one way valve allowing air flow into the cylinder.

One of the principal features of the invention is to provide a simple method of achieving stratification and turbulence in a four stroke internal combustion engine by the swirling action of incoming air.

Other features and advantages of the embodiments of the invention will become known by reference to the following general description, appended claims and attached drawings.

THE DRAWINGS

Before explaining the embodiments of the invention in detail, it is to be understood that the invention is not limited in its application to the details of the construction and arrangement of parts set forth in the following general description or illustrated in the accompanying drawings, since the invention is capable of other embodiments and of being practiced or carried out in various ways. Also, it is to be understood that the phraseology or terminology employed herein is for the purpose of description and not of limitation.

GENERAL DESCRIPTION

Figure 1:
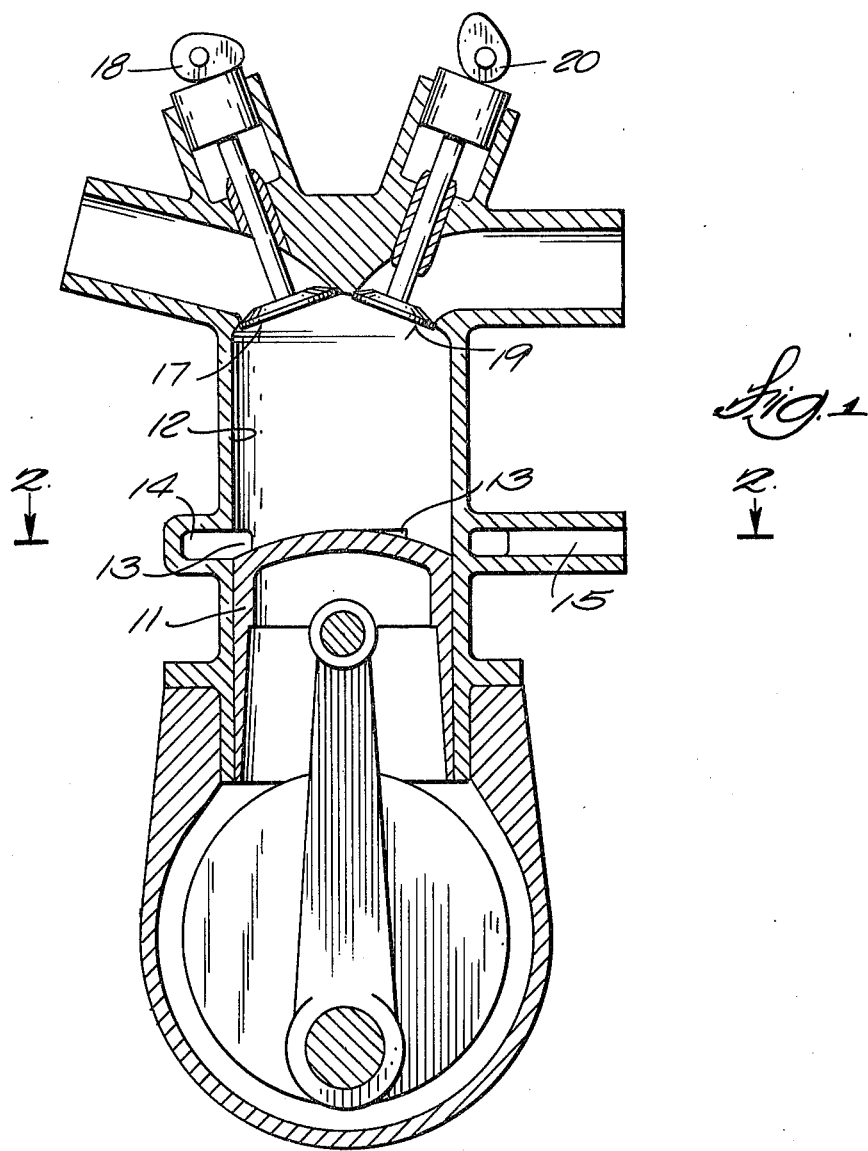
FIG. 1 is a sectional elevation of an engine embodying the invention.
Figure 2:
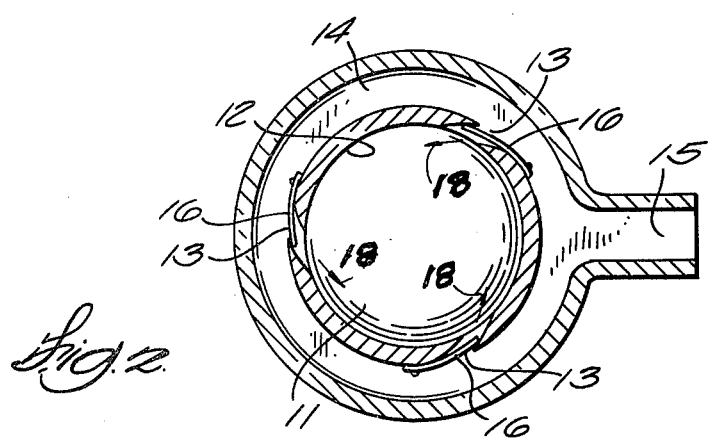
FIG. 2 is a sectional view taken along lines 2—2 in FIG. 1.

FIG. 1 shows how when the piston 11 is approaching bottom dead center (it is shown in FIG. 1 at bottom dead center) the last movement of the piston on the induction stroke draws air into the cylinder 12 through ports 13 arranged circumferentially around the cylinder wall. FIG. 2 shows that there are three ports 13 arranged circumferentially around the cylinder wall, and communicating with a surrounding chamber or gallery 14 connected to a source of air at 15 which may merely be the surrounding air or may be the outlet from a means for providing a pressurized flow of air such as a pump driven by the engine. Each port 13 is fitted with a reed valve 16 permitting air to enter the cylinder when there is a pressure differential across it but preventing gas from escaping from the cylinder.

The main fuel-air inlet valve 17 is arranged to be closed by its cam 18 as the ports 13 begin to be uncovered.

On the induction stroke the piston draws in fuel/air mixture through the port 17 which is closed as the piston approaches bottom dead center and starts to uncover the air ports 13. Thus the final movement of the piston draws air in through the ports 13 and their reed valves.

The tangential direction of the ports 13 shown in FIG. 2 causes the incoming air to swirl generally as indicated at 19 which produces stratification and turbulence.

On the compression stroke the reed valves prevent escape of charge before the ports 13 are covered, and on the subsequent working stroke, even after the ports are uncovered as the piston approaches bottom dead center, the reed valves 16 will prevent loss of the ignited charge and loss of pressure.

On the exhaust stroke the burnt products of combustion are discharged through the exhaust valve 19 which is suitably opened by 18 within the cylinder; thus producing Various of the features of the invention are set forth in the following claims.

What is claimed is:

1. An internal combustion engine comprising a cylinder, a piston movable in said cylinder between top dead center and bottom dead center positions, a plurality of air entry ports located in the cylinder adjacently above said piston when said piston is at bottom dead center and adapted to be opened and closed in response to piston movement, said air entry ports being arranged around said cylinder in an angularly spaced series and extending generally tangentially from said cylinder so that air entering said cylinder through said ports swirls within said cylinder, an air chamber extending at least partially circumferentially around said cylinder and communicating with a source of air and with said plurality of said air entry ports, and a separate reed valve operatively associated with each of said ports for preventing flow from said cylinder to said air chamber and permitting flow into said cylinder from said air chamber.

2. An internal combustion engine in accordance with claim 1 wherein said source of air comprises means for providing a pressurized flow of air.

3. An internal combustion engine in accordance with claim 1 wherein said engine is a four stroke engine.

4. An internal combustion engine in accordance with claim 3 wherein said cylinder includes a head end spaced from said piston when said piston is at bottom dead center and further including a main inlet port adjacent said head end of said cylinder, and means for closing said main inlet port as said piston approaches bottom dead center.

* * * * *